(12) United States Patent
Pantalone, III et al.

(10) Patent No.: US 11,242,140 B2
(45) Date of Patent: Feb. 8, 2022

(54) METHOD OF REMOVAL AND REPLACEMENT OF A TIP SECTION OF A ROTOR BLADE

(71) Applicant: Sikorsky Aircraft Corporation, Stratford, CT (US)

(72) Inventors: Joseph Pantalone, III, Guilford, CT (US); Timothy James Conti, Shelton, CT (US); Frank M. Caputo, Cheshire, CT (US); Sven R. Lofstrom, Irving, TX (US); Keith M. Schenone, Fairfield, CT (US); Robert D. Higbie, Haslet, TX (US); Eric Charles Boyle, Haslet, TX (US); Alicia Fernandez, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 14 days.

(21) Appl. No.: 16/100,947

(22) Filed: Aug. 10, 2018

(65) Prior Publication Data
US 2020/0047878 A1 Feb. 13, 2020

(51) Int. Cl.
*B29C 65/78* (2006.01)
*B29C 65/00* (2006.01)
(Continued)

(52) U.S. Cl.
CPC ........ *B64C 27/463* (2013.01); *B29C 65/7841* (2013.01); *B29C 66/721* (2013.01);
(Continued)

(58) Field of Classification Search
CPC ......... Y10T 29/49316; Y10T 29/49318; Y10T 29/4932; Y10T 29/49332; Y10T 29/49718;
(Continued)

(56) References Cited

U.S. PATENT DOCUMENTS 4,407,688 A * 10/1983 Mussi ................ B29D 99/0025
156/242
4,892,462 A * 1/1990 Barbier .............. B29D 99/0025
416/134 A (Continued)

FOREIGN PATENT DOCUMENTS

WO 2017171704 A1 10/2017

OTHER PUBLICATIONS

Scallan, Peter. "Process Planning—The Design/Manufacture Interface", 7.8.2.5 Box Jigs., Elsevier 2003, https://app.knovel.com/hotlink/pdf/id:kt009XACJ3/process-planning-design/box-jigs, Accessed May 21, 2020.

(Continued)

*Primary Examiner* — Sarang Afzali
*Assistant Examiner* — Darrell C Ford
(74) *Attorney, Agent, or Firm* — Foley & Lardner LLP

(57) ABSTRACT

A method of mounting a replacement tip section to an exposed end of a rotor blade includes removing an existing tip section from the rotor blade to create the exposed end of the rotor blade, installing the rotor blade having the exposed end onto a holding fixture, assembling the replacement tip section about the exposed end of the rotor blade, positioning a bonding fixture about the replacement tip section, and curing the replacement tip section to the exposed end of the rotor blade.

16 Claims, 6 Drawing Sheets

(51) Int. Cl.
*B29L 31/08* (2006.01)
*B64C 27/46* (2006.01)
*B29D 99/00* (2010.01)
*B64C 27/473* (2006.01)

(52) U.S. Cl.
CPC .... *B29D 99/0025* (2013.01); *B29L 2031/082* (2013.01); *B64C 2027/4736* (2013.01)

(58) Field of Classification Search
CPC ......... Y10T 29/49721; Y10T 29/49723; Y10T 29/49725; Y10T 29/47926; Y10T 29/49728; Y10T 29/4973; Y10T 29/49732; Y10T 29/49734; Y10T 29/49737; Y10T 29/49748; Y10T 29/4975; B29C 73/14; B29C 65/7841; B29L 2031/082
USPC .............. 29/402.01, 402.03, 403.04, 402.05, 29/402.06, 402.08, 402.09, 402.13, 29/402.19, 402.21, 889.2, 889.7
See application file for complete search history.

(56) References Cited

U.S. PATENT DOCUMENTS

| | | | | |
|---|---|---|---|---|
| 4,991,437 | A * | 2/1991 | Hanchett | G01M 1/12 269/254 CS |
| 5,007,167 | A * | 4/1991 | Hill | B23D 45/006 269/296 |
| 5,320,494 | A * | 6/1994 | Reinfelder | B64C 27/463 156/701 |
| 5,430,937 | A * | 7/1995 | Leahy | B29C 70/446 29/889.6 |
| 5,908,522 | A * | 6/1999 | Lofstrom | B64C 11/205 156/94 |
| 6,006,407 | A | 12/1999 | Reverman et al. | |
| 6,197,146 | B1 | 3/2001 | Sucic et al. | |
| 7,216,408 | B2 | 5/2007 | Boyl-Davis et al. | |
| 7,246,998 | B2 | 7/2007 | Kovalsky et al. | |
| 7,771,173 | B2 | 8/2010 | Leahy et al. | |
| 8,146,250 | B2 * | 4/2012 | Moroso | F01D 5/282 29/889.1 |
| 8,303,882 | B2 * | 11/2012 | Driver | B29C 70/44 264/314 |
| 10,927,991 | B2 * | 2/2021 | Yokoyama | B29C 65/02 |
| 11,091,254 | B2 * | 8/2021 | Lehto | B64F 5/40 |
| 2005/0141995 | A1 * | 6/2005 | Logan | B64C 27/473 416/134 A |
| 2007/0231156 | A1 * | 10/2007 | Hong | B64F 5/40 416/241 R |
| 2009/0191062 | A1 * | 7/2009 | Metivier | B29C 70/30 416/226 |
| 2012/0124833 | A1 * | 5/2012 | Arendt | F03D 13/40 29/889.7 |
| 2012/0222306 | A1 * | 9/2012 | Mittendorf | F01D 5/005 29/889.1 |
| 2013/0221580 | A1 * | 8/2013 | Bishop | B29C 70/46 264/479 |
| 2013/0309096 | A1 | 11/2013 | Le Bras et al. | |
| 2015/0308415 | A1 * | 10/2015 | Rajasingam | B29C 65/78 156/196 |
| 2016/0001404 | A1 | 1/2016 | Mierzejewski et al. | |
| 2016/0243654 | A1 | 8/2016 | Hu et al. | |
| 2016/0288218 | A1 | 10/2016 | De Anda et al. | |
| 2017/0074236 | A1 | 3/2017 | Hynum et al. | |
| 2018/0044038 | A1 | 2/2018 | Smith et al. | |
| 2020/0031086 | A1 * | 1/2020 | Paulson | B64C 11/26 |
| 2020/0047919 | A1 | 2/2020 | Lofstrom et al. | |

OTHER PUBLICATIONS

U.S. Non-Final Office Action; U.S. Appl. No. 16/100,971, filed Aug. 10, 2018; dated May 21, 2020; 152 pages.
Scallan, Peter, "Process Planning—The Design/Manufacture Interface—7.8.2.5 Box Jigs", Elsevier, (2003), retrieved Apr. 9, 2020 from https://app.knovel.com/hotlink/pdf/id:kt009XACJ3/process-planning-design/box-jigs (132 pages).
U.S. Office Action on U.S. Appl. No. 16/100,971 dated May 21, 2020 (20 pages).
Final Office Action on U.S. Appl. No. 16/100,971 dated Nov. 24, 2020 (12 pages).
Notice of Allowance on U.S. Appl. No. 16/100,971 dated Mar. 17, 2021 (8 pages).

* cited by examiner

METHOD OF REMOVAL AND REPLACEMENT OF A TIP SECTION OF A ROTOR BLADE

BACKGROUND

Exemplary embodiments relate to rotor blades, and more particularly to a method of removing and replacing a tip section on an existing composite blade.

Conventional rotary wing aircraft rotor blades often include a tip section having a selected sweep, taper, and form to improve the blade performance. Rotor blade tip sections having an anhedral or other non-straight form are subjected to the greatest stresses and strains, as compared to the balance of the rotor blade, due to aerodynamic forces, and experience the greatest structural degradation due to wear and abrasion (due to the high rotational velocity of the main rotor blade tip), during operation of the helicopter main rotor assembly.

The structure for a rotor tip section includes the structural upper and lower airfoil blade skins and shaped honeycomb core that is integrally bonded to the inboard section of the blade during the primary blade assembly. The bonded joint between the primary blade structure or spar and the tip end core and structural tip end skins may be later augmented with mechanical fasteners to produce a redundant joint. This approach makes replacement of additional length of the tip, for example the complex geometry portion of the blade tip, relatively difficult and labor intensive.

BRIEF DESCRIPTION

According to an embodiment, a method of mounting a replacement tip section to an exposed end of a rotor blade includes removing an existing tip section from the rotor blade to create the exposed end of the rotor blade, installing the rotor blade having the exposed end onto a holding fixture, assembling the replacement tip section about the exposed end of the rotor blade, positioning a bonding fixture about the replacement tip section, and curing the replacement tip section to the exposed end of the rotor blade.

In addition to one or more of the features described above, or as an alternative, in further embodiments comprising preparing the surface of the exposed end of the rotor blade by removing contaminants from the surface of the exposed end of the rotor blade.

In addition to one or more of the features described above, or as an alternative, in further embodiments the curing the replacement tip section includes applying heat to the replacement tip section.

In addition to one or more of the features described above, or as an alternative, in further embodiments the heat is applied to the replacement tip section via at least one preset cycle.

In addition to one or more of the features described above, or as an alternative, in further embodiments the curing the replacement tip section is performed by positioning the replacement tip section of the rotor blade into an oven.

In addition to one or more of the features described above, or as an alternative, in further embodiments the curing the replacement tip section is performed by one or more heating blankets positioned about the bonding fixture.

In addition to one or more of the features described above, or as an alternative, in further embodiments the assembling the replacement tip section about the exposed end of the rotor blade further comprises installing a first tip skin about a first side of the exposed end of the rotor blade and installing a second tip skin about a second side of the exposed end of the rotor blade, the second side being opposite the first side.

In addition to one or more of the features described above, or as an alternative, in further embodiments positioning the bonding fixture about the tip section further comprises installing a first mold adjacent to the first tip skin, installing a second mold adjacent to the second tip skin, and connecting the first mold and the second mold, wherein the second mold includes a bladder and a caul operable to apply a pressure over the tip section.

In addition to one or more of the features described above, or as an alternative, in further embodiments the replacement tip section has a different shape than a shape of the existing tip section such that the resulting rotor blade with the replacement tip section has different aerodynamic performance as compared to the rotor blade with the existing tip section.

In addition to one or more of the features described above, or as an alternative, in further embodiments the replacement tip section has a substantially similar shape as the existing tip section such that the resulting rotor blade with the replacement tip section has similar aerodynamic performance as compared to the rotor blade with the existing tip section.

In addition to one or more of the features described above, or as an alternative, in further embodiments comprising: measuring at least one outer mold line surface of the exposed end of the rotor blade and comparing the measured at least one outer mold line surface with a predetermined profile.

In addition to one or more of the features described above, or as an alternative, in further embodiments comprising modifying the at least one outer mold line surface to match the predetermined profile.

In addition to one or more of the features described above, or as an alternative, in further embodiments modifying the at least one outer mold line surface includes applying an adhesive or composite to the at least one outer mold line surface.

In addition to one or more of the features described above, or as an alternative, in further embodiments comprising forming one or more holes in the tip section cured to the exposed end of the rotor blade.

In addition to one or more of the features described above, or as an alternative, in further embodiments comprising trimming excess material from the tip section cured to the exposed end of the rotor blade.

According to another embodiment, a holding fixture for supporting a rotor blade during replacement of a tip section of the rotor blade includes a movable frame having an upper surface, and at least one support mounted to the upper surface. A contour of the at least one support is complementary to a portion of the rotor blade. A cantilever support is mounted at an end of the movable frame. The tip section of the rotor blade is supportable on the cantilever support. A bonding fixture is associated with the cantilever support.

In addition to one or more of the features described above, or as an alternative, in further embodiments the bonding fixture further comprises a first mold positionable adjacent to a first side of the tip section, a second mold positionable adjacent to a second side of the tip section, a bladder coupled to an inner surface of the second mold, and a caul attached to the bladder, opposite the second mold.

In addition to one or more of the features described above, or as an alternative, in further embodiments the at least one support is located about the frame to receive an intermediate section of the rotor blade.

In addition to one or more of the features described above, or as an alternative, in further embodiments comprising an oven closeout mounted to the frame adjacent the cantilever end.

In addition to one or more of the features described above, or as an alternative, in further embodiments a size and shape of the oven closeout is selected to seal an opening formed in an oven door through which the cantilever end of the frame is extendable.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
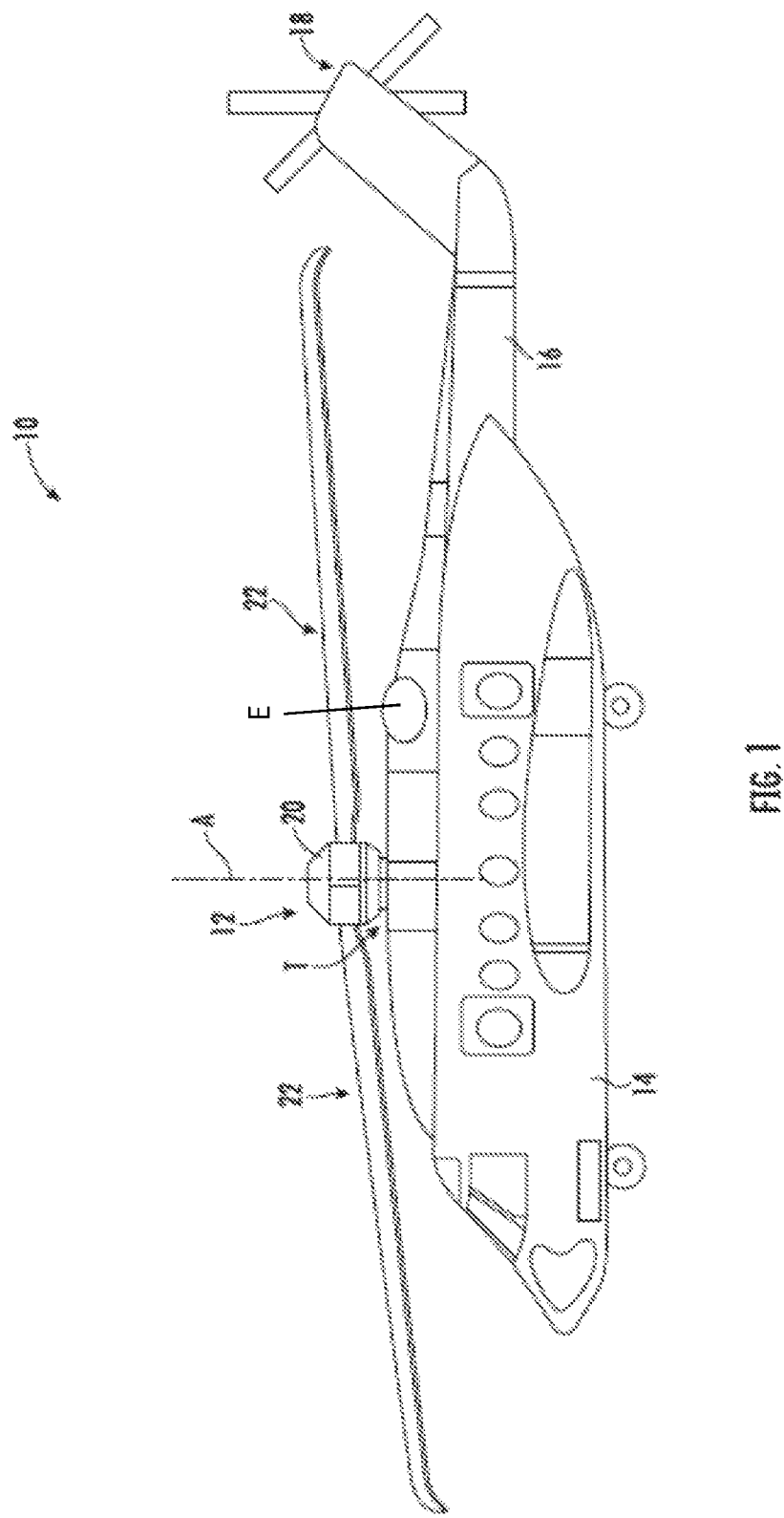
FIG. 1 is a perspective view of an example of a rotary wing aircraft.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20 assembly. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircrafts, will also benefit from embodiments of the disclosure.

Figure 2:
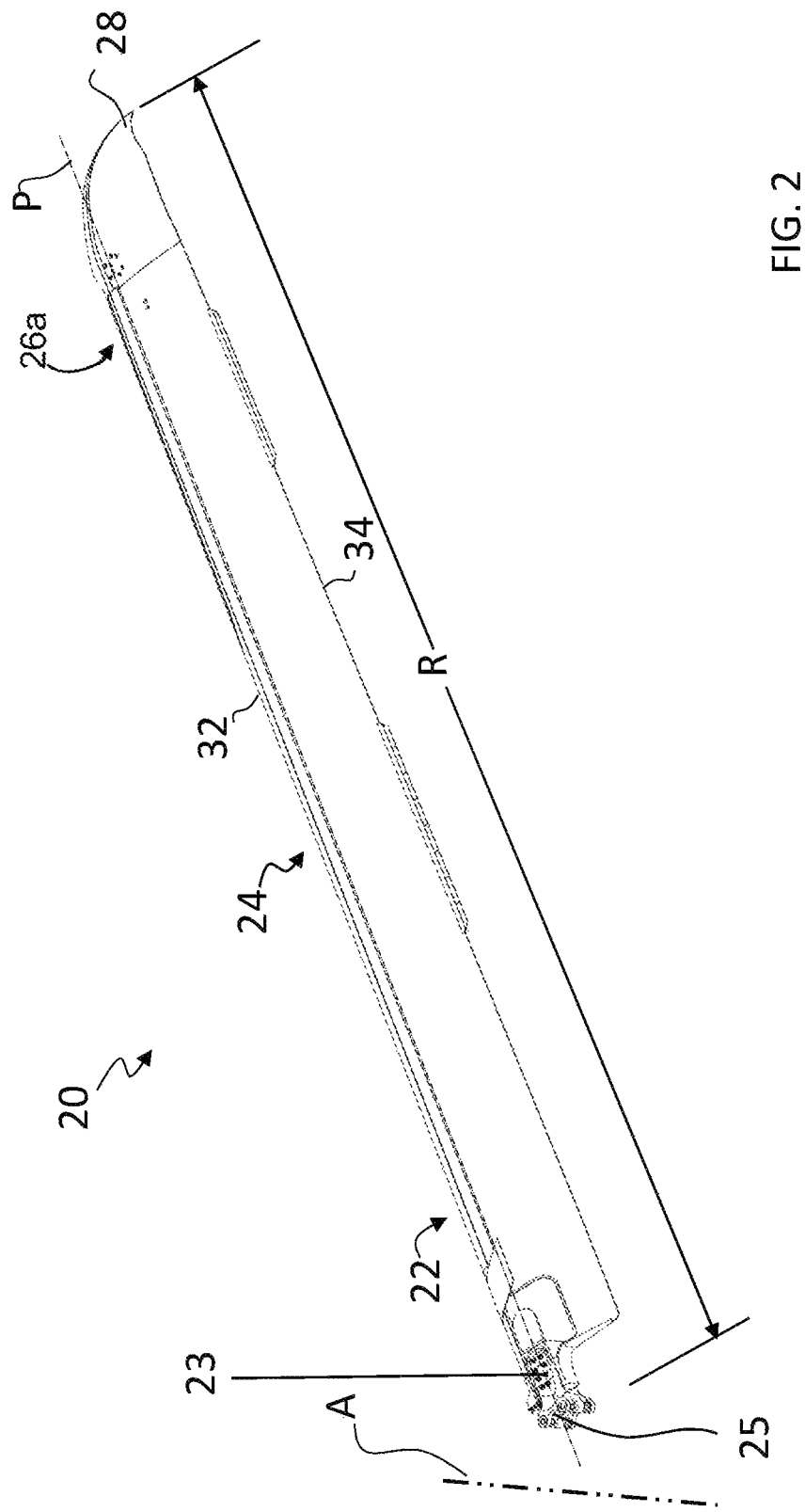
FIG. 2 is a perspective view of an example of a rotor blade of a rotary wing aircraft.

Referring to FIG. 2, each rotor blade assembly 20 of the rotor assembly 12 generally includes a root section 22, an intermediate section 24 and an existing tip section 26a. A blade cuff 23 is typically mounted at the inboard end 25 of the root section of the blade 20. Each rotor blade section 22, 24, 26 may define particular airfoil geometries to tailor the rotor blade aerodynamics to the velocity increase along the rotor blade span. As illustrated, the rotor blade tip section 26 may include an anhedral form (not shown); however, any angled or non-angled forms such as cathedral, gull, bent, and other non-straight forms are within the scope of the present disclosure. The anhedral form (not shown) as defined herein may include a rotor blade tip section 26 which extends at least partially out of a plane defined by the intermediate section 24.

The rotor blade sections 22, 24, 26 define a span R of the main rotor blade assembly 20 between the axis of rotation A and a distal end 28 of the blade 20 such that any radial station may be expressed as a percentage in terms of a blade radius x/R. The rotor blade assembly 20 defines a longitudinal feathering axis P between a leading edge 32 and a trailing edge 34.

In an embodiment, the rotor blade assembly 20 is an advanced tip wide chord rotor blade having an increased lift compared to conventional blades. Examples of an advanced tip wide chord rotor blade are suitable for use on the S-92, the H-60M, and a multitude of aircraft models that are variants of both the S-92 and the H-60M. However, it should be understood that any suitable blade assembly is within the scope of the disclosure. Existing wide chord rotor blades have separate tip assemblies or sections 26 that are bonded to the spar and the main skins of the rotor blade 20. As used herein, the term "main skin" represents that one or more pieces of skin that cover both the root section 22 and the intermediate section 24 of the rotor blade 20. These tip assemblies include composite skins, such as including graphite or fiberglass for example, and are operable to transfer a load from the tip of the blade to the spar. The tip assembly is bonded at the mating area to an exposed surface of the spar (such as through an adhesive material like an epoxy file adhesive) and fastened using fasteners. In one embodiment, the fasteners are oversized relative to the holes in the spar for the removed fasteners. Examples of such tip assemblies and connections are illustrated and described in more detail in U.S. Pat. No. 5,320,494, filed on Dec. 22, 1992, the entire contents of which are incorporated herein by reference.

Figure 3:
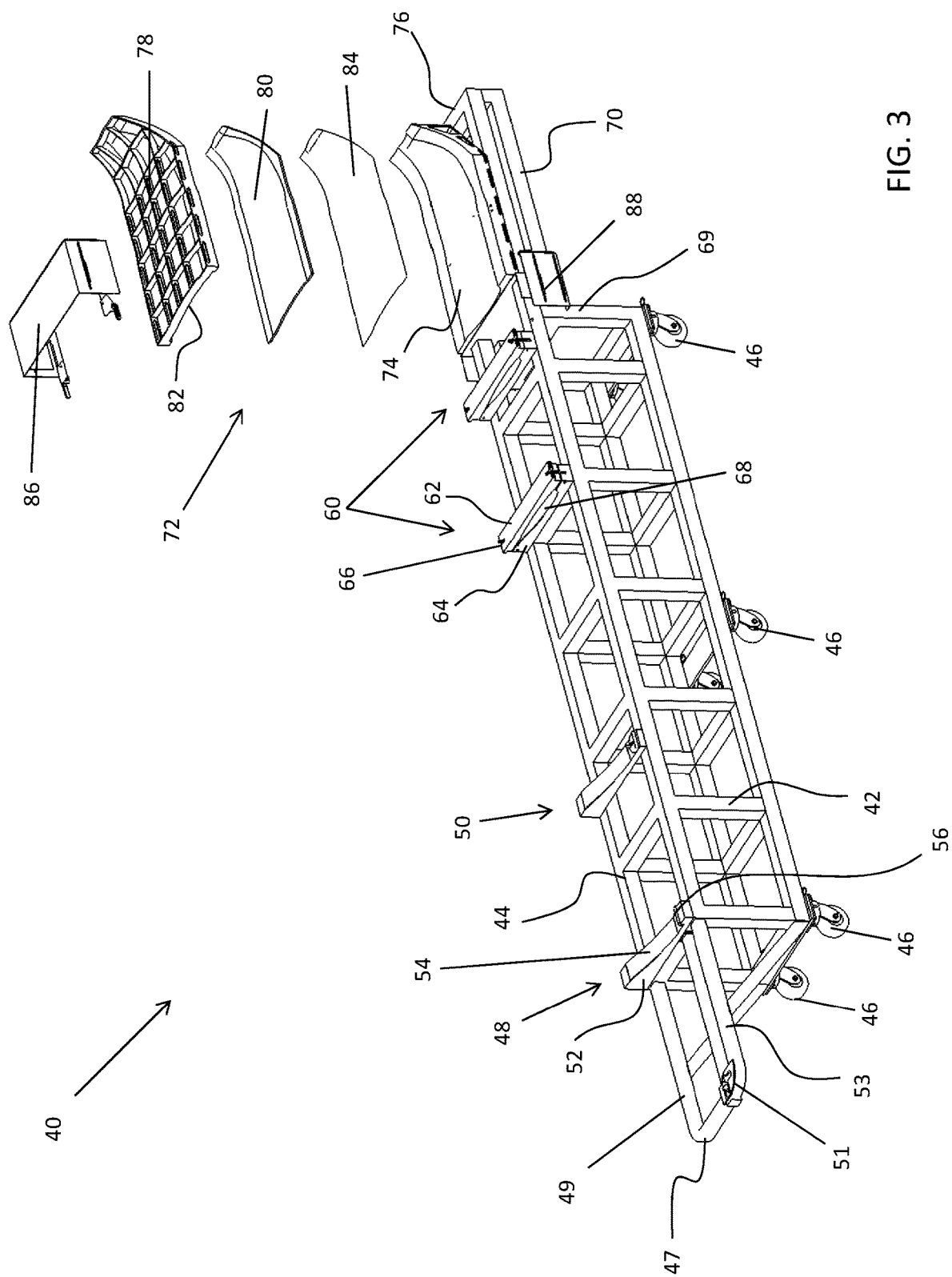
FIG. 3 is a perspective view of a holding fixture for supporting a rotor blade during replacement of a tip section according to an embodiment.
Figure 4:
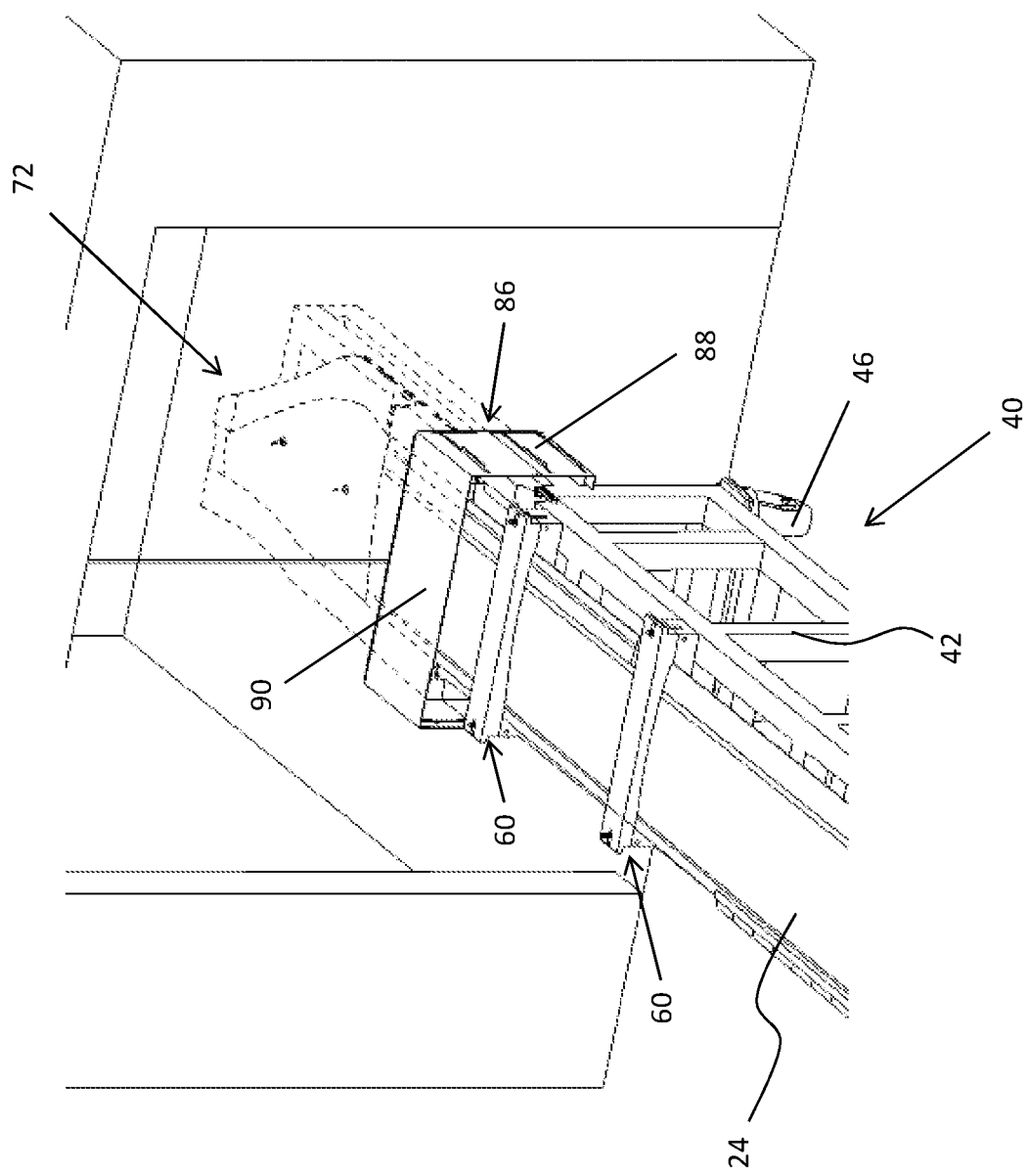
FIG. 4 is a perspective view of the holding fixture for supporting a rotor blade installed at least partially within an oven during an out of autoclave curing operation.

With reference now to FIGS. 3-4, a holding fixture 40 for supporting the rotor blade assembly 20 during the installation and cure of a tip section 26 is illustrated. The holding fixture 40 is a movable assembly including a mount or frame 42 having an elongated, generally planar upper surface 44. In an embodiment, the frame 42 is supported by a plurality of wheels, casters, or another movable mechanism 46 to facilitate movement of the holding fixture 40, such as into and out of an oven, autoclave, or other suitable curing device to be described in more detail later. The upper surface 44 of the frame 42 may be sized to receive all or a portion of the length of the rotor blade assembly 20 thereon.

In an embodiment, a first contour support 48 and a second contour support 50 are mounted to the upper surface 44 of the frame 42, for example near the inboard end of the intermediate section of the rotor blade 20. As shown, the first contour support 48 and the second contour support 50 may be substantially identical, or alternatively, may be different. The configuration of the contour supports 48, 50 will depend on the airfoil and twist changes that occur along the span of the rotor blade. Each of the first and second contour supports 48, 50 includes a base 52, and in an embodiment, the contour of the exposed surface 54 of the base 52 corresponds to an adjacent surface of the rotor blade 20. A lip 56 extends from an edge of the base 52 such that a portion of the blade assembly 20 may be rested on the surface 54 of the and movement of the blade assembly 20 relative to the contoured support 48, 50 and the frame 42 is restricted by the lip 56.

The holding fixture 40 may additionally include one or more clamping supports 60 mounted to the upper surface 44 of the frame 42. As shown, the fixture 40 includes two clamping supports 60 arranged near an outboard end of the intermediate section 24 of the rotor blade 20. Although the clamping supports 60 illustrated in the FIG. appear identical, in some embodiments, the clamping supports may vary based on the airfoil and twist changes that occur along the span of the rotor blade. However, it should be understood that a holding fixture 40 having any number of contoured supports 48, 50 and any number of clamping supports 60 having any configuration and arranged at any location about the fixture 40 is considered within the scope of the disclosure.

Each clamping support 60 includes a vertically stacked first support plate 62 and second support plate 64. In an embodiment, the first support plate 62 and the second support plate 64 are detachably coupled to one another, such as with one or more fasteners 66 for example. Alternatively, the first support plate 62 and the second support plate 64 may be pivotally coupled adjacent a first end such that the second support plate 64 is movable relative to the first support plate 62 between an open position and a closed position. The inner surfaces of the first and second support plates 62, 64 have a contour corresponding to an adjacent surface of the intermediate section 24 of the rotor blade assembly 20. As a result, when the second support plate 64 is substantially aligned with the first support plate 62 to define a chamber 68 within which the rotor blade 20 is received, the clamp support 60 applies a pressure to the surface of the rotor blade assembly 20 to prevent movement thereof relative to the to both the support 60 and the frame 44.

Located at a first end 47 of the frame is a U-shaped support 49 configured to receive the inboard end 25 of the rotor blade 20. A feature 51 formed in a leading edge side 53 of the support 49 functions as a stop via engagement with a portion of the blade cuff 23. In an embodiment, the feature 51 abuts against a spindle attachment lug (not shown) of the cuff. However, any suitable engagement between the feature 51 and the cuff 23 to restrict movement of the blade 20 relative to the frame 44 is within the scope of the disclosure.

Located at an opposite end 69 of the frame 44 is a cantilevered support 70 upon which the tip section 26 of the rotor blade 20 is receivable. A bonding fixture 72 may be used in conjunction with the cantilevered support 70 to cure the tip section 26 to the blade assembly 20. The bonding fixture 72 includes a first mold 74 positioned on an upper surface 76 of the cantilevered support 70. The first mold 74 has a contour complementary to a first surface, such as a lower surface for example, of all or a portion of the tip section 26. A second mold 78 is configured to mount in overlapping arrangement with the first mold 74 to substantially enclose the tip section 26. As shown, the second mold 78 has a contour complementary to a second surface, such as an upper surface for example, of all or a portion of the tip section 26. However, it should be understood that the bonding fixture 72 may be adapted to receive the rotor blade 20 in various orientations. In an embodiment, an inflatable pillow bladder 80 is mounted to an interior surface 82 of the second mold 78, and an inner caul 84 is positioned between the bladder 80 and a surface of the tip section 26 of the rotor blade 20. In other embodiments, the bladder 80 may be mounted to an interior surface of the first mold 74 such that the caul 84 is position between the bladder and an adjacent surface of the tip section 26. The bladder 80 and caul 84 cooperate with the molds 74, 78 to apply pressure to the tip section 26 and the joint formed between the intermediate section 24 and the tip section 26.

An oven closeout 86 may be positioned at the interface between the cantilevered support 70 and the remainder of the frame 42. In the illustrated, non-limiting embodiment, the oven closeout 86 is formed in a complementary first portion 88 and second portion 90. The second portion 90 vertically aligns the first portion 88 to form a boundary that delineates the portion of the rotor blade 20 to which heat may be applied to affix the new tip section 26 to the remainder of the rotor blade assembly 20. In an embodiment, the portion of the rotor blade 20 outboard of the oven closeout is receivable within an oven, and the oven closeout may seal an opening formed in one or more adjustable doors of the oven (see FIG. 4).

Figure 5:
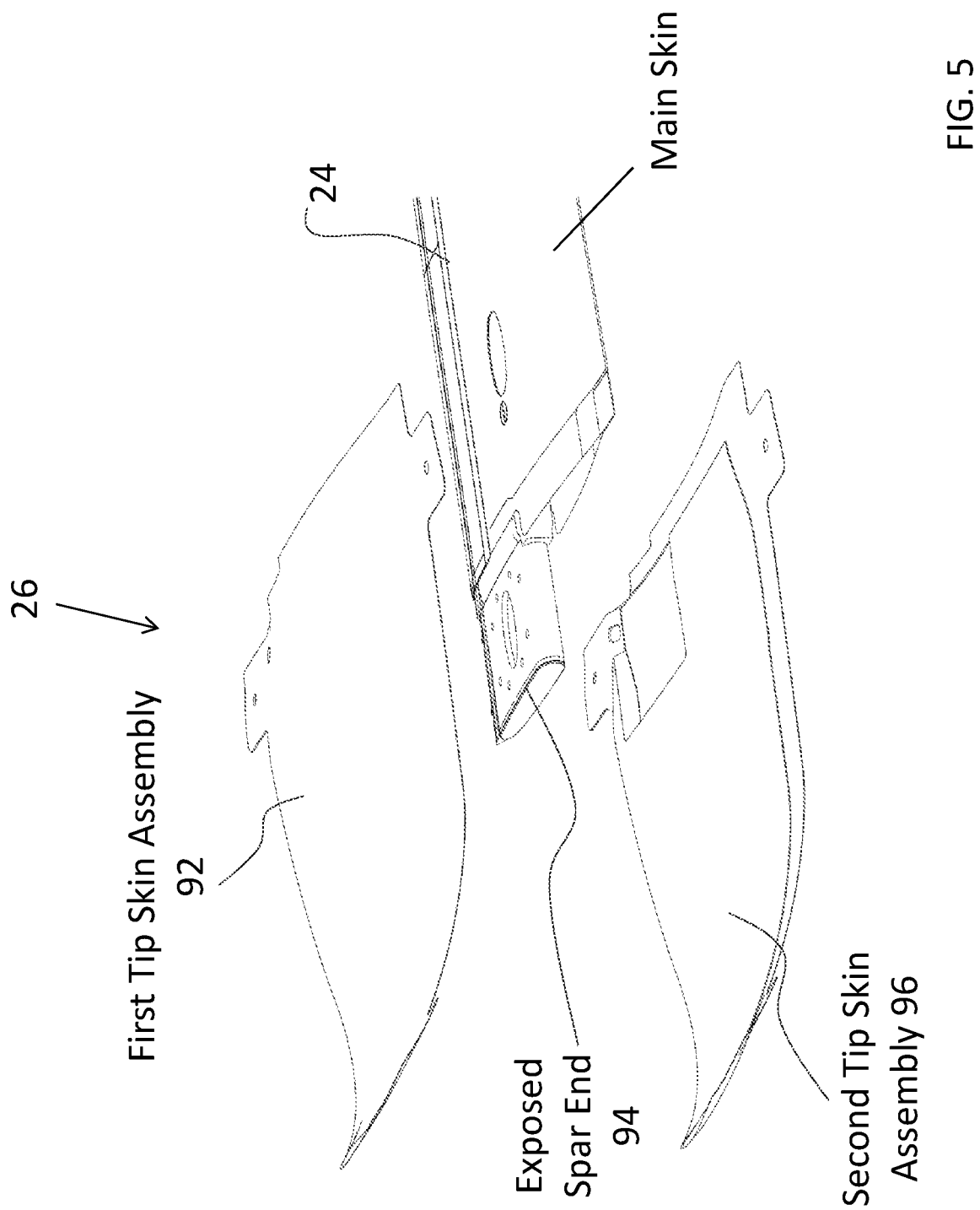
FIG. 5 is an exploded view of a replacement tip section of a rotor blade assembly according to an embodiment.

An exploded view of a replacement tip section 26 is shown in FIG. 5. In the illustrated, non-limiting embodiment, the replacement tip section 26 includes a first tip skin assembly 92 positionable about a first surface of the exposed spar end 94 and a second tip skin assembly 96 positionable about a second, opposite surface of the exposed spar end 94. However, in other embodiments, the first tip skin assembly 92 and the second tip skin assembly 96 may be integrally formed as a single piece, or alternatively, one or both of the first tip skin assembly 92 and second tip skin assembly 96 may include several pieces.

Figure 6:
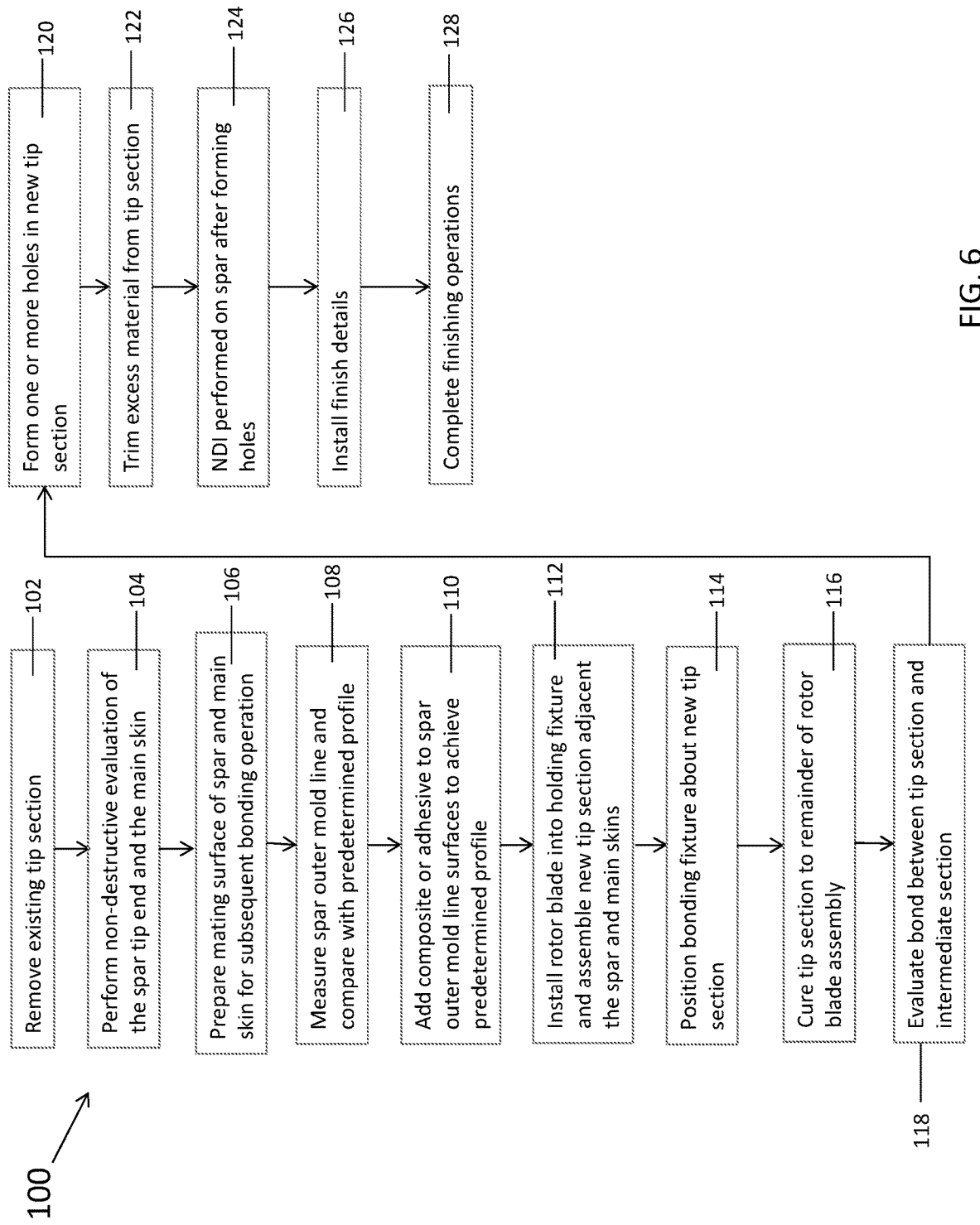
FIG. 6 is a flow diagram of a method of replacing a tip section of an existing rotor blade assembly according to an embodiment.

With reference now to FIG. 6, a method 100 of replacing a tip section 26 of an existing rotor blade assembly 20 is illustrated in more detail. As shown, the method 100 includes removing the existing tip section, as shown in block 102. In an embodiment, removing the existing tip section includes one or more of forming a chordwise saw cut just outboard of the spar tip end 94 of the rotor blade 20 to separate the tip section 26 from the remainder of the rotor blade 20, removing fasteners or hardware from the tip section 26 of the rotor blade assembly 20, and removing residual adhesive from the surface of the exposed spar and the skin attached to the main skin of the rotor blade 20. Upon removal of the previous tip section 26, in block 104, a non-destructive evaluation of the spar tip end 94 and the main skin is performed. In an embodiment, the evaluation is an ultrasonic inspection to identify any voids and disbonds of the rotor blade laminates to determine whether the rotor blade assembly 20 is usable.

If the rotor blade 20 is determined to be usable, the surfaces of the spar and main skins are prepared for a subsequent bonding operation, for example by eliminating contaminants, such as oil and/or grease, as shown in block 106. In block 108, the spar outer mold line surfaces are then measured to determine any variations relative to a desired predetermined contour thereof. In an embodiment, a composite or adhesive shim may be added to the spar outer mold line surfaces where necessary, as shown in block 110 to achieve a desired contour and a good fit between the new tip section and the existing spar surface.

Once the spar outer mold line surfaces match the predetermined contour, in block 112, the rotor blade 20 is installed into the holding fixture 40 and the new tip section 26 including an upper and lower tip skin assemblies 92, 96 are assembled about the spar end 94. In an embodiment, assembling the new tip section 26 includes laying a first skin assembly 92 in overlapping arrangement with the first mold 74 of the bonding fixture 72. One or more adhesive layers are positioned over an exposed surface of the first skin assembly 92 between the first skin assembly 92 and the spar end 94. Similarly, a second skin assembly 96 is positioned adjacent the spar end 94, opposite the first skin assembly 92, and one or more adhesive layers may be positioned there between. The bonding fixture 72 is then positioned about the new tip section in block 114. Positioning the bonding fixture 72 includes installing the second mold 78, including the inflatable bladder 80 and the caul 84, over the second skin assembly 96 such that the first and second skins assembly 92, 96 of the tip section 26 are sandwiched between the first and second molds 74, 78. The molds 74, 78 are then pinned in place and the first and second portions 88, 90 of the oven closeout 86 are coupled to one another. In block 116, the tip section 26 is then bonded to the remainder of the blade assembly 20 by curing the tip skins assemblies 92, 96 to the exposed spar end 94, for example in an oven having a preset cycle. In such embodiments, during the bonding operation, the outboard end of the rotor blade assembly 20, up to but not including the oven closeout 86, is positioned within the oven. The remainder of the blade 20, i.e. the root end 22 and the majority of the intermediate section 24 are positioned outside of the oven. In another embodiment, an alternative heat source, such as a heater blanket for example, may be applied to the tip section 26 and used to cure the tip skins assemblies 92, 96 to the spar and main skins in place of the oven previously described. In such embodiments, the rotor blade 20 may be, but need not be, installed in the holding fixture 40.

In an embodiment, the bond between the tip skins 92, 96 and the intermediate section 24 of the rotor blade assembly 20 may then be evaluated, as shown in block 118. Alternatively, or in addition, one or more holes, may be formed in at least one surface of the new tip section 26 of the rotor blade, see block 120. Such holes include holes for fasteners to attach the replacement tip section 26 to the rotor blade 20, and for weight cups according to aspects of the disclosure. In addition, as shown in block 122, excess material may be trimmed from a trailing edge of the tip section 26, such as with a fixture and a hand router for example. Although the trimming of the excess material is illustrated as occurring after the one or more holes have been formed, in other embodiment, the trimming operation may occur prior to formation of the holes. The method additionally includes Non-Destructive Inspection or Non-Destructive Testing performed on the spar after formation of the holes, shown in block 124, and installing one or more finish details in block 126. Examples of finish details include, but are not limited to the leading edge composite detail and the trim tab for example, as well as bonding the tip section 26 at the mating area to an exposed surface of the exposed spar end 94 (such as through an adhesive material like an epoxy file adhesive) and fastened using fasteners fastened through the holes created in block 120. In one embodiment, the fasteners are oversized relative to the holes in the spar for the removed fasteners. In block 128, finish operations, such as surface screed, balancing, and painting for example, are completed.

The method illustrated and described herein, allows for replacement of a tip section 26 of a rotor blade 20 using a tip section having an improved design and/or complex geometry resulting in increased performance. Replacement of the tip section 26 allows existing rotor blades 20 to be modified as needed for an application, rather than requiring fabrication of completely new blades. Further, the replacement method described herein may be used to replace a tip section with a substantially identical tip section during standard overhaul and/or repair operations.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of mounting a replacement tip section to an exposed end of the rotor blade of a rotary wing aircraft, the method comprising:
    removing an existing tip section from an outboard end of the rotor blade to create the exposed end of the rotor blade by forming a chordwise saw cut outboard of a spar of the rotor blade, the rotor blade comprising an inboard end opposite the exposed end;
    installing the rotor blade having the exposed end onto a cantilevered end of a holding fixture such that the exposed end is received at the cantilevered end and the inboard end is received at an opposed end of the holding fixture opposite the cantilevered end such that the exposed end includes a feature that functions as a stop with respect to the inboard end;
    assembling the replacement tip section about the exposed end of the rotor blade, the replacement tip section including at least one tip skin;
    positioning a bonding fixture about the replacement tip section; and
    curing the replacement tip section to the exposed end of the rotor blade.

2. The method of claim 1, further comprising preparing the surface of the exposed end of the rotor blade by removing contaminants from the surface of the exposed end of the rotor blade.

3. The method of claim 1, wherein the curing the replacement tip section includes applying heat to the replacement tip section.

4. The method of claim 3, wherein the heat is applied to the replacement tip section via at least one preset cycle.

5. The method of claim 3, wherein the curing the replacement tip section is performed by positioning the replacement tip section of the rotor blade into an oven.

6. The method of claim 3, wherein the curing the replacement tip section is performed by one or more heating blankets positioned about the bonding fixture.

7. The method of claim 1, wherein the at least one tip skin further comprises a first tip skin and a second tip skin and assembling the replacement tip section about the exposed end of the rotor blade further comprises:
    installing the first tip skin about a first side of the exposed end of the rotor blade; and installing the second tip skin about a second side of the exposed end of the rotor blade, the second side being opposite the first side.

8. The method of claim 7, wherein positioning the bonding fixture about the tip section further comprises:
installing a first mold adjacent to the first tip skin, the first mold positioned on the cantilevered end of the holding fixture;
installing a second mold adjacent to the second tip skin; and
connecting the first mold and the second mold, wherein the second mold includes a bladder and a caul operable to apply a pressure over the tip section.

9. The method of claim 1, wherein the replacement tip section has a different shape than a shape of the existing tip section such that the resulting rotor blade with the replacement tip section has different aerodynamic performance as compared to the rotor blade with the existing tip section.

10. The method of claim 1, wherein the replacement tip section has a substantially similar shape as the existing tip section such that the resulting rotor blade with the replacement tip section has similar aerodynamic performance as compared to the rotor blade with the existing tip section.

11. The method of claim 1, further comprising:
measuring at least one outer mold line surface of the exposed end of the rotor blade; and
comparing the measured at least one outer mold line surface with a predetermined profile.

12. The method of claim 11, further comprising modifying the at least one outer mold line surface to match the predetermined profile.

13. The method of claim 12, wherein modifying the at least one outer mold line surface includes applying an adhesive or composite to the at least one outer mold line surface.

14. The method of claim 1, further comprising:
forming one or more holes in the tip section cured to the exposed end of the rotor blade.

15. The method of claim 1, further comprising:
trimming excess material from the tip section cured to the exposed end of the rotor blade.

16. The method of claim 1, wherein the bonding fixture is on the cantilevered end of the holding fixture.

* * * * *